Sept. 5, 1967 J. G. EARLE 3,340,388
LATCHED CARRY SAVE ADDER CIRCUIT FOR MULTIPLIERS
Filed July 12, 1965 2 Sheets-Sheet 1

INVENTOR
JOHN G. EARLE
BY Delbert C. Thomas
ATTORNEY

Sept. 5, 1967 J. G. EARLE 3,340,388

LATCHED CARRY SAVE ADDER CIRCUIT FOR MULTIPLIERS

Filed July 12, 1965 2 Sheets-Sheet 2

3,340,388
LATCHED CARRY SAVE ADDER CIRCUIT FOR MULTIPLIERS

John G. Earle, Wappingers Falls, N.Y., assignor to International Business Machines Corporation, Armonk, N.Y., a corporation of New York
Filed July 12, 1965, Ser. No. 471,021
5 Claims. (Cl. 235—176)

ABSTRACT OF THE DISCLOSURE

A binary adder circuit to generate a sum signal and a carry signal from three binary digit representing signals and their three complemental signals. Each output signal is generated when a control clock signal rises to a higher voltage level and continues so long as the input signals remain in an output signal generating combination. During the time that the control clock signal is at its lower voltage level, the adder circuit is latched to prevent change in the input signals from altering the output signals. The binary adders may be connected in sequence to combine a plurality of operand factors.

This invention relates to a consolidated full-binary adder and D.C. latch circuit, and more particularly to a latch which is gated by selected ones of the combinations of a number of input signals for setting on the rise of a pulse of a clock signal to generate a data signal output and which will thereafter maintain that data signal output so long as the combination of data signals remains present and thereafter until the rise of the next pulse of said clock signal.

It has previously been conventional in high-speed parallel data processing machines to process data through a plurality of logic circuits during one phase of a clock pulse to generate desired result, either intermediate or final, and to then during the other phase of said clock pulse retain such result in a group of data storage latches called a register. The result may thereafter be read from the register in another clock pulse through the same or other logic circuits for further processing. This type of data processing is satisfactory so long as the total of the transmission time of a signal through the logic and latches is not such a significant part of the machine clock cycle that the result signal does not stabilize during the first clock phase. In present and projected data processors, the data repetition rate or full clock cycle is being reduced to such a short interval (i.e., about 20 nanoseconds) that even with the fastest speed logic circuits (e.g., a switching time of two to five nanoseconds), data can be safely processed through only a few levels of logic circuits in one phase of a clock cycle. It is therefore obvious that to enable use of such short clock cycles, we must reduce to a minimum the number of sequential logic levels through which data must pass to generate a result during any phase of a clock cycle.

The preferred embodiment hereinafter described shows how the logic time previously required to operate the latches of a register for storing of data may be eliminated by combining the latches with the final level of function logic whereby previously required latch operating time is no longer needed. This combination of previously separate functions enables data to be processed through more function levels during a clock cycle, or, for the same number of functions to be performed, permits a reduction in the machine cycling time heretofore allocated for the performed data functions and thus permits more data to be processed in a given time interval than has previously been possible.

It is then an object of this invention to provide a functional latch which is capable of both performing a logical function and thereafter retaining an output representing the results of said function performance for as long as needed.

It is also an object of this invention to provide a new type of function performing hardware capable of more rapid operation and repetition than has heretofore been possible.

It is a further object of the invention to provide a functional circuit which is combined with an improved bistable state latch whch may be gated through the functional circuit on the rise of a clock pulse to be set to one of its bistable states and which is thereafter latched in that stable state until the next rise of the gate pulse.

The foregoing and other objects, features and advantages of the invention will be apparent from the following more particular description of a preferred embodiment of the invention, as illustrated in the accompanying drawings.

*Detailed description*

Figure 1:
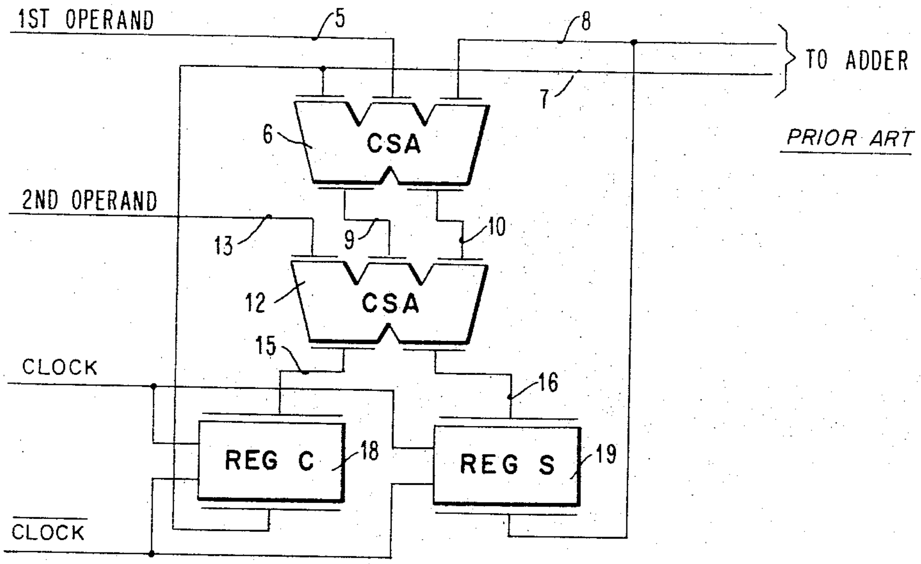
FIG. 1 is a diagrammatic representation of the partial products adder part of a conventional electronic data processing machine.

The adder shown in FIG. 1 is a portion of a data processing machine representative of the prior art and is primarily used for high-speed multiplication. In this adder, a first operand which may be one multiple of a multiplicand is supplied on a group of wires 5 to one of the inputs of a carry save adder (CSA) 6. Adder 6 has two other operand inputs 7 and 8 and has two operand outputs 9 and 10 for carries and sums respectively with each input and output comprising a plurality of conductors to carry all of the signals of an operand word in parallel. The CSA 6 comprises for each denominational order of the inputs and outputs, a full binary adder of one of the well-known types (e.g., the adders shown in page 92 of "Arithemetic Operations in Digital Computers," by R. K. Richards, published 1955 by D. Van Nostrand Co.)

The two outputs 9 and 10 of CSA 6 are connected to two of the three inputs of a second CSA 12 which has its third input 13 connected to receive a second operand of a multiplication operation. It will be noticed that each CSA reduces the number of factors by one; that is, three input circuits are reduced to two, and clearly if more than two operands are to be combined in one operation, additional CSA's may be connected in a series and parallel arrangement to reduce the number of outputs to two.

It is to be understood that the carry and sum outputs resulting from the corresponding denominational inputs of one denominational order of a CSA are actually in different denominational orders and in any connection of CSA's as above suggested, appropriate connection shifts should be made.

The two outputs 15 and 16 of the last CSA 12 represent partial product factors of the operands thus far added and can be stored in two registers 18 and 19. Conventionally, registers 18 and 19 will comprise two bistable latches for each denominational order. The first latch will be set to an active state during a first half (CLOCK) of a machine timing cycle if there is a data signal on its input and will be set to its inactive state if there is no input data signal. The second bistable latch will be set to the same state as the first latch but on a later phase ($\overline{\text{CLOCK}}$) of the machine timing cycle. Thus, the output of the second bistable latch of a register may be gated back through functional logic to the input of the same register without causing an uncontrolled oscillatory or race condition wherein the output will cause an input change which changes the output, etc. As shown in FIG. 1, the outputs of registers 18 and 19 are gated out to lines 7 and 8 and become inputs to CSA 6 for re-entry with and addition to the next group of input operands. At the conclusion of such carry save additions of all input operands, the combination of states of the second latches in registers 18 and 19 represents the final product and the outputs of the two registers will be added together in a two-input parallel adder (not shown) to generate signals representing the final product in one operand word.

In such prior art structure, all of the data processing and the setting of the first register latch was done in the first half (CLOCK) of the machine timing cycle and only the second register latch was set in the second half machine cycle ($\overline{\text{CLOCK}}$). Since the two halves of the cycle have substantially equal duration, this arrangement did not utilize a substantial time period in the second half cycle where data processing could have been done.

Figures 2, 3:
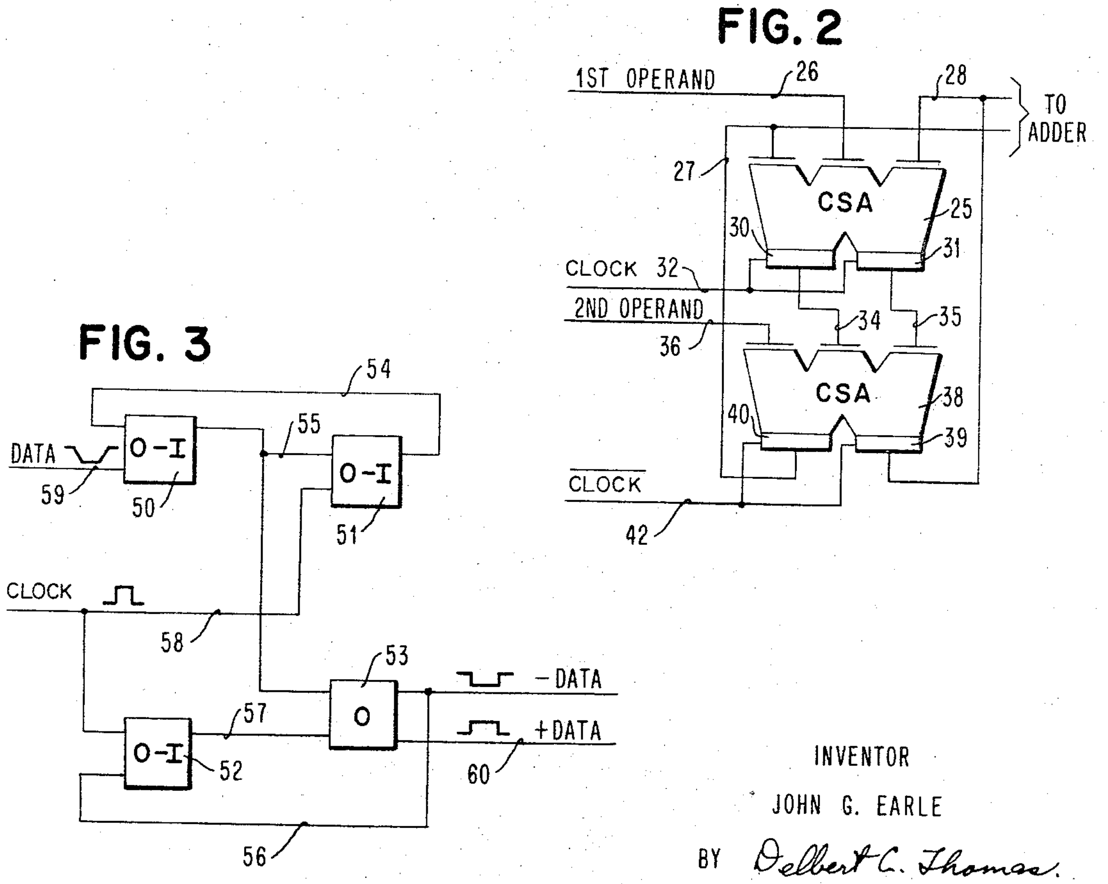
FIG. 2 is a diagrammatic representation of an adder having a function similar to that of FIG. 1 but showing the improved structure.
FIG. 3 is a diagrammatic showing of the circuit of an improved bistable data latch.

The embodiment shown in FIG. 2 distributes the data processing and the latching functions approximately equally between the two halves of a machine cycle to eliminate such wasted time and additionally combines the logical and latching hardware into a single circuit of fewer switching levels to permit shorter machine cycles. In FIG. 2, a CSA 25 receives the first operand, and the two factors representing a previously determined partial product on the three input lines 26, 27 and 28 respectively. The carry and sum outputs of CSA 25 are then stored in a pair of latches 30 and 31 by a timing signal CLOCK on line 32. Signal CLOCK is effective during the first half of the machine cycle and as soon as it is present it will set the latches 30 and 31 to hold the values of the factors then present at the outputs of CSA 25. As soon as the latches 30 and 31 are set by signal CLOCK, their output signals on lines 34 and 35 are switched with a delay of only one logic level switching time to the signals representing the carry and sum factors and these factors will be combined with a second operand input on lines 36 in a second CSA 38 having latches 39 and 40 on its output circuits. During the remainder of the first part of the machine cycle, the CSA 38 circuits will attain a steady state condition so that when signal $\overline{\text{CLOCK}}$ on line 42 is applied to latches 39 and 40 during the second half of the timing cycle, the generated output factors of CSA 38 will be set into latches 39 and 40 and will immediately become available on input lines 27 and 28 of CSA 25 for entry at the next occurrence of signal CLOCK. By this arrangement, there will be the same amount of data processing in each half of the timing cycle. This, by elimination of unused time in the second half cycle and a reduction of the time needed in each half cycle to pass signals through fewer logic levels, will permit the use of a faster machine timing cycle than has previously been required. In preliminary models of machines using the principles of this invention, timing cycles are being used which are from one-half to two-thirds as long as the cycles which would be required for the same speed hardware to perform the same functions if connected as in the prior art.

To use such circuitry to the best advantage, a new type of latch circuit has been devised for the latches 30, 31, 39 and 40. This new latch is diagrammatically shown in FIG. 3 and is comprised of four logic blocks interconnected as shown. Each logic block is effectively an OR circuit controlling an inverter (O–I) and may be constructed in the form of a current switching circuit as set out in assignee's U.S. Patent 2,964,652 issued to Hannon S. Yourke on Dec. 13, 1960 (FIG. 3 extended as in the lower half of FIG. 5). Logic blocks 50, 51, and 52 are provided with only the complemental output line (terminal 25 of FIG. 3 of Yourke) and act to lower the voltage on the output lead whenever any input lead is at a positive or "1" signal level. Logic block 53 is provided with both the true and complemental output leads of FIG. 3 of Yourke so that both phases of the output signal are available and the block is labeled "0" to indicate an OR function.

In FIG. 3, logic block 50 has a plurality of inputs, one of which is a lead 54 connected to the output of block 51 and the others being data lines carrying complemental data signals; i.e., presence of a "1" signal is indicated by low voltage on the lead. Output 55 of block 50 is an input to blocks 51 and 53 and the complemental (upper) output 56 of block 53 is an input of a block 52 whose output 57 is an input of block 53. A timing signal line 58 is an input to both blocks 51 and 52.

In operation, the data lines 59 of block 50 will be set at voltages (complemental) representative of the data to be latched during the interval that timing line 58 is at its lower voltage and must remain at that set data voltage during the time that line 58 is at its higher voltage. As soon as the voltage on line 58 rises to its upper level, block 51 responds by dropping its output voltage on line 54 and now, if all data lines 59 are at the lower level, block 50 will respond by raising its output voltage on line 55 which then keeps block 51 active independently of the voltage on line 58. Thus, if the voltages of the data lines 59 permit it, a latch 50–51 will be set on the rise of voltage of line 58 and will then stay set independently of further voltage changes on line 58, but only so long as the data input on lines 59 does not change.

The ouput voltage of block 50 on line 55 is also applied as an input to block 53 so that as soon as the latch 50–51 is set, the block 53 will respond by lowering its output voltage on line 56 and raising the voltage of its output line 60, thus indicating that the latch combination has been set.

Since, however, latch 50–51 will, if set, return to its unset condition as soon as the data on line 59 change; and as it is desired to hold the data output on lines 56 and 60 until the rise of the next timing signal on line 58 even though new data are received, a fourth block 52 is provided to form a second latch with block 53. While the timing lead 58 is at its higher voltage, block 52 holds its output lead 57 at a low voltage. If, however, latch 50–51 has been set, when the voltage on line 58 drops, logic block 52 now has both its inputs at a low voltage and its output lead 57 goes to its upper voltage to then hold block 53 active, regardless of the dropping of voltage on line 53 when data lines 59 change to a no-signal condition. Thus, when latch 50–51 is set, a second latch 52–53 will be set on the drop of the timing signal on line 58 to maintain a signal output on lines 56 and 60 for the remainder of the complete timing cycle.

Figure 4:
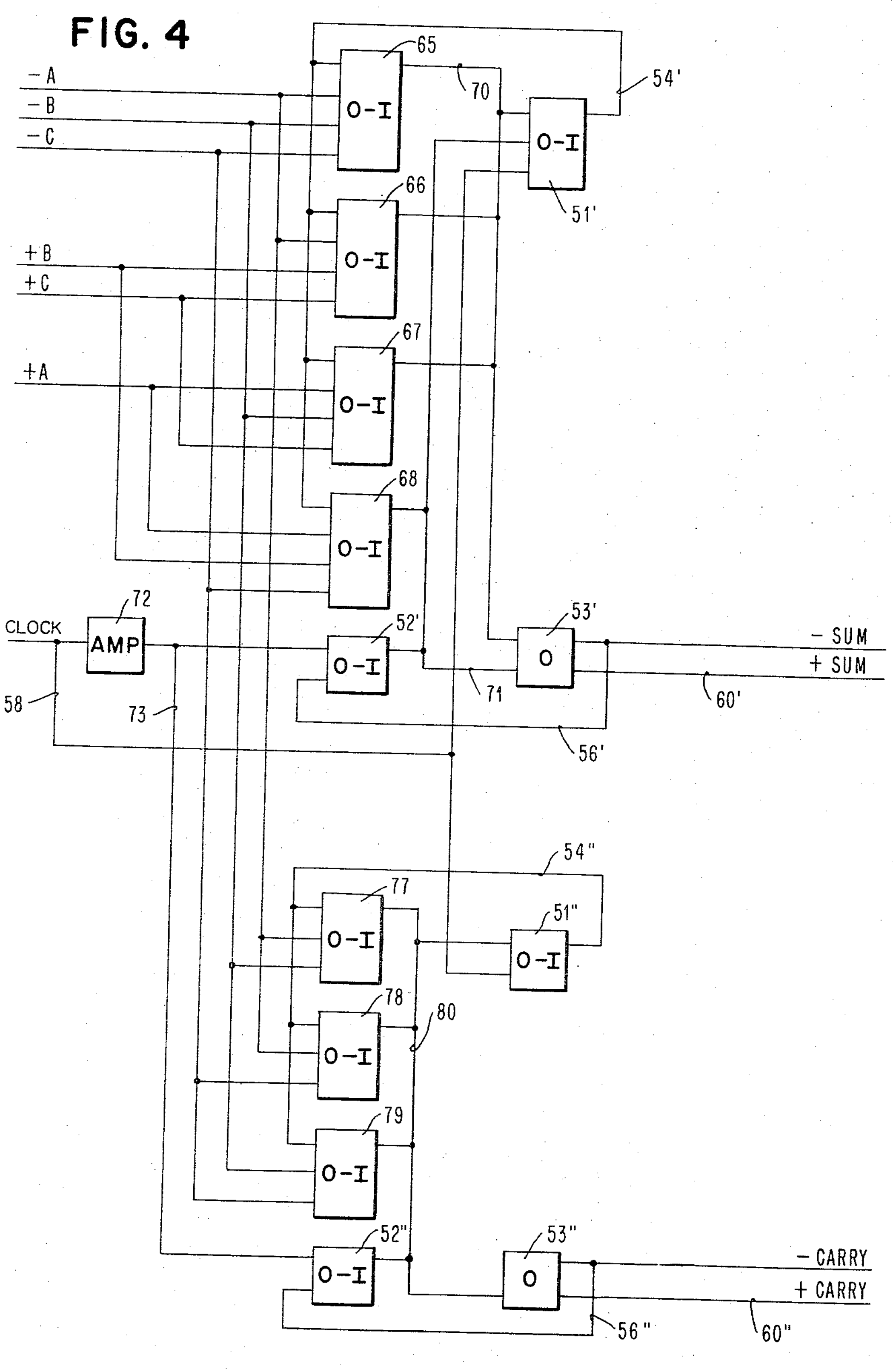
FIG. 4 is a circuit diagram of an improved binary full-added circuit utilizing the latch of FIG. 3.

The circuit of FIG. 4 shows one denominational order of a carry-save adder (CSA) with a retaining latch as described above. Here the logic blocks corresponding to blocks 51, 52, and 53 of FIG. 3 are present and have been given the same reference numbers with prime superscripts and the same numbers with primes have been used for similar output leads. At the left side of the figure, logic block 50 of FIG. 3 is replaced by four blocks 65, 66, 67, 68, each having four input leads, one of which is lead 54' from the associated block 51'. The other inputs are selected combinations of the true and complemental signals of the three inputs A, B, and C representing the input signals to one denominational order of a CSA. The first block 65 has inputs of —A, —B, and —C, the minus sign indicating that the data voltage goes down when a significant digit signal is present. The other blocks 66, 67, and 68 receive, respectively, the input combinations —A, B and C; A, —B and C; and A, B, and —C. The outputs of blocks 65, 66 and 67 are connected together in a Dot OR configuration on line 70 which is an input to blocks 51' and 53'. A Dot OR configuration is a logical OR function which is achieved without insertion of any additional components or levels of circuit elements, e.g., by sharing of a common load resistor between a number of active elements. In adapting circuits such as those of FIG. 3 of the Yourke patent above, it is usual to provide an emitter follower circuit to isolate and to power each of the output signal lines. By connecting the emitters of a number of such outputs together, the signal at the emitters will be the positive OR function of the functions of the individual circuits, as at 7A in FIG. 5 of Yourke. The output of block 68 is Dot ORed with the output of block 52' on a line 71 which is also an input of blocks 51' and 53'. In the hardware used, up to four outputs can be Dot ORed to a single line and this will enable a substantial number of logic block outputs to be used to drive the maximum of four inputs to a block. The timing signal on line 58 is a direct input to block 51' but passes through an amplifier 72 to an output lead 73 which is an input to block 52'. The amplifier 72 balances the number of logic devices in the paths from the timing line 58 to the output leads 56' and 60' for the two halves of the timing cycle and prevents possible spikes from appearing in the output leads. With the input connections shown, the output 60' of the left side of FIG. 4 will represent the sum, modulo 2, of the three input signals A, B, and C.

To complete a full binary adder circuit, it is necessary to generate a carry term and this is done by the circuits in the lower half of FIG. 4. Here logic blocks 51", 52", and 53" also correspond to blocks 51, 52, and 53 of FIG. 3 and are distinguished by the double prime superscripts. Three blocks 77, 78 and 79 all receive the output signals of block 51" over common input lead 54 and also receive two-signal combinations of the signals on the three input leads —A, —B, and —C; i.e., —A—B; —A—C; and —B—C respectively. The outputs of blocks 77, 78 and 79 are Dot ORed with the output of block 52" on a single lead 80 which is an input of blocks 51" and 53". With such inputs to block 53", the output signal on lead 60" is the carry signal of the binary full-adder.

Thus, the circuit of FIG. 4 will, when used for each denomination of CSA's 25 and 38, receive the inputs on the three lines of the denomination and reduce them to two latched signals. By using alternate phases of the clock signal on the two control lines 32 and 42, the processing done in each phase is substantially equalized, enabling a reduction in the overall length of a timing cycle. Since the output signals are present at the terminals 53', 53", 60' and 60", of the CSA's 25 and 38 with a delay of only three logic block switching times after the rise of the clock pulse and remain present for the full duration of a timing cycle, there is a complete overlap of the inputs to a CSA with the positive part of the timing cycle which latches the input signal in the CSA circuits. Thus, there are no hazard or race conditions and the timing cycle used need be very little longer than the time needed to be sure the correct data are processed through the worst case channel and entered into a latch. Thus, the reduction of the number of logic levels through which data must pass and the balance between the processing of the data in the two halves of a timing cycle permit a substantial reduction in the amount of time required for processing, or enable a greater amount of work to be done in a given time.

While the invention has been particularly shown and described with reference to a preferred embodiment thereof, it will be understood by those skilled in the art that various changes in form and details may be made therein without departing from the spirit and scope of the invention.

What is claimed is:

1. An adder unit for generating consecutive groups of signals representing the successive partial products of a multiplication operation, said adder unit comprising:

a first carry save adder having three pairs of input signal lines for entering signals representing three operands to be added, each denominational order of said carry save adder comprising a latch circuit having a plurality of input components, each input component receiving a gate signal and a combination of an input signal line from each pair of the three input signal lines for said denominational order;

a latch control circuit initially activated by a clock signal during a setting phase thereof to generate said gate signal and thereby to enable a selected combination of input signals, if present, to pass through one of said input components to generate an output signal;

a circuit conducting said output signal to said latch control circuit to maintain said gate signal so long as said one input component receives its selected combination of input signals;

a sum signal generating circuit controlled by said input components to provide a sum signal when any input component generates an output signal and another element controlled by said clock signal and said sum signal generating circuit to maintain the generating state of said sum signal generating circuit during the non-setting phase of said clock signal;

each denominational order of said carry save adder also including a second plurality of input components receiving combinations of said input signals, a second latch control circuit, a second output signal conducting circuit, a second another element controlled by said clock signal and a carry signal generating circuit to provide a signal indicative of the presence of two or more significant signals on said input lines to said denominational order;

a second carry save adder receiving said sum signals and said carry signals on two of its inputs and a fourth operand on its third input said second carry save adder being settable by a complemental clock signal to generate a set of second sum signals and a set of second carry signals and means conducting said second set of sum output signals to one operand input of said first carry save adder and said second set of carry output signals to a second operand input of said first carry save adder.

2. An adding unit for a data processing machine which generates during each machine cycle of a plural cycle operation, a plurality of operands to be added, said adding unit comprising a carry save adder for each of said operands;

each carry save adder comprising a full binary adder latch for each denominational order thereof, and each binary adder latch including:

a plurality of input gates, each receiving a gating signal and a group of signals representing binary digits of the operands to be added, each input gate generating an output signal when the gating signal and a predetermined combination of input signals are supplied thereto;

a clock signal input connection receiving an AC clock signal having alternate setting and holding phases, a gating signal generator activated by the setting phase of said clock signal or the output signal of any of said input gates to produce said gate signal;

a sum output signal generator providing a sum signal in response to any generated output signal and a sum signal latching circuit controlled by said sum signal and by said holding phase of said clock signal to maintain a generated sum output signal during said holding phase, said carry save adder also including:

a second plurality of input gates, a second gating signal generator, a carry output signal generator and
a carry signal latching circuit similarly interconnected and controlled by said clock signal and said input signals to generate a signal representative of a denominational order carry,
means connecting the sum signal and carry signal outputs of a first of said carry save adders as some of the inputs to a second of said carry save adders;
means connecting the sum signal and carry signal outputs of the second of said carry save adders to some of the inputs of said first carry save adder;
means connecting said operand signals to the remaining inputs of said carry save adders and
means to supply a clock signal of one phase to the clock signal inputs of a first of said carry save adders and a clock signal of complemental phase to the clock signal input of a second of said carry save adders.

3. A latchable full binary adder circuit comprising: input circuits to receive the true and complemental values of three binary inut signals;
four sum signal input gates, each receiving as its input a selected one of the possible combinations of said input signals and also a common gating signal, and generating an output signal when the selected input signal combination is present with said gating signal,
a gating signal generator responsive to the output signals of all said sum signal output gates to generate said gating signal when any output signal is generated;
an AC clock signal input lead connected to an input of said gating signal generator to force generation of said gating signal during a setting phase of said clock signal,
a sum signal generator activated by any of said output signals,
and a latch signal circuit controlled by the output signal of said sum signal generator when activated and by said clock signal during its non-setting phase to maintain said sum signal generator activated until the next setting phase of said clock signal,
said adder circuit also comprising:
three carry signal input gates, each carry signal input gate receiving as inputs a selected one of the combinations of input signals and also a second common gating signal and generating an output signal when all inputs to said gate are at a significant level,
a second gating signal generator responsive to the output signals of all said carry signal output gates to generate said second common gating signal, said second gating signal generator being also connected to said AC clock signal input lead to be forced to generate said second gating signal during said setting phase of said clock signal;
a carry signal generator activated by any output signal from said carry signal input gates and
a second latch signal circuit controlled by the output signal of said carry signal generator when activated and said clock signal during its not-setting phase to maintain said carry signal generator activated until the next setting phase of said clock signal.

4. A latched binary full adder circuit responsive to three data representing signals and a clocking signal to generate output signals representing a modulo 2 sum and carry of the input signals,
said adder circuit comprising for each output signal,
a plurality of input gates, each receiving a common gating signal and a selected one of the combinations of input signals to generate an output signal,
a gating signal generating circuit responsive to any generated output signal to supply said common gating signal,
a clock signal circuit carrying an AC signal having a setting phase and a holding phase and connected to said gating signal generating circuit to cause generation of said gating signal during said setting phase,
an output signal circuit also responsive to any generated output to supply an adder output signal and
an output latching signal generator responsive to signals in said output signal circuit and to said clock signal circuit during said holding phase to maintain active said output signal circuit during said holding phase when it is activated during said setting phase.

5. A latchable function circuit responsive to a timing signal having a setting phase and a holding phase and to a plurality of input signals to generate an output signal when said timing signal begins its setting phase and thereafter during said holding phase, if one of a number of selected combinations of input signals is present, said circuit comprising:
a plurality of gates, each responsive to a common gating signal and one of said combinations of input signals to generate an output signal;
a gating signal generator receiving said clock signal and generating said gating signal during said setting phase of said clock signal;
connections from said input gates to said gating signal generator to thereafter maintain said gating signal generator active so long as said combination of input signals is applied to said input gate;
an output signal generator driven by the output of any input gate to supply a function output signal so long as an input gate generates an output signal and
an output latch circuit responsive to said clock signal and to said function output signal to control said output signal generator to maintain a generated function output signal during said holding phase.

References Cited

UNITED STATES PATENTS

| | | | |
|---|---|---|---|
| 3,094,614 | 6/1963 | Boyle | 235—176 |
| 3,207,922 | 9/1965 | Gruodis et al. | 307—88.5 |

MALCOLM A. MORRISON, *Primary Examiner.*

V. SIBER, *Assistant Examiner.*